June 23, 1964 — L. H. CUTLER — 3,138,177
FLOW CONTROL DEVICE

Filed Sept. 6, 1961 — 2 Sheets-Sheet 1

Inventor:
Leon H. Cutler by Thomas A. Briody
His Attorney

June 23, 1964    L. H. CUTLER    3,138,177
FLOW CONTROL DEVICE
Filed Sept. 6, 1961    2 Sheets-Sheet 2
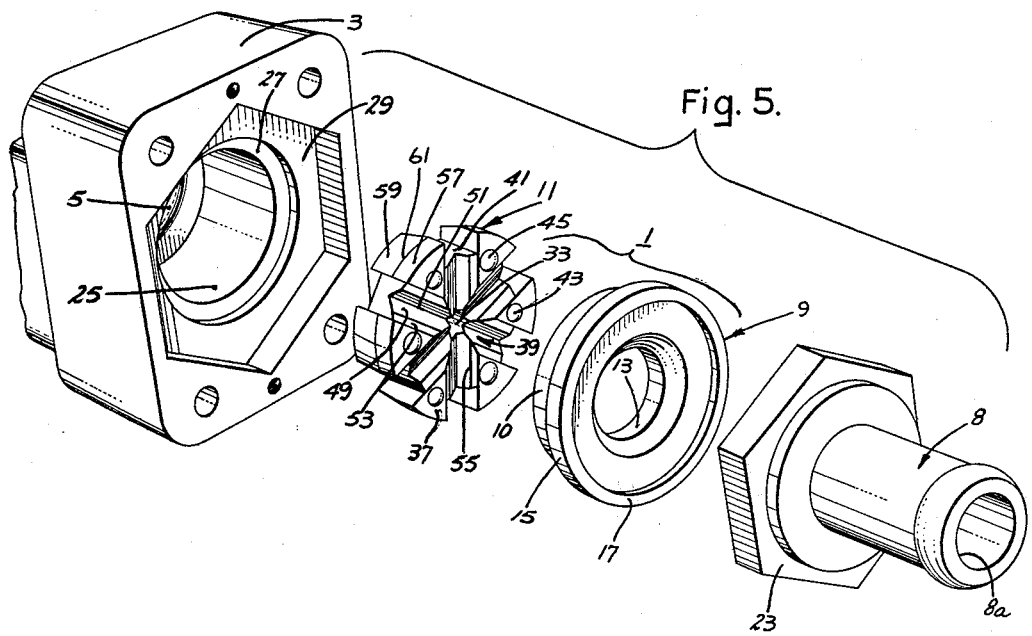
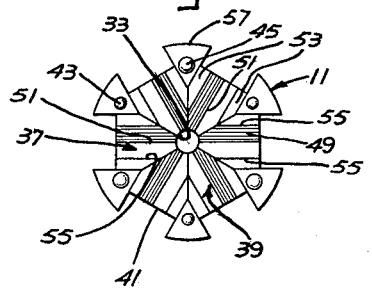
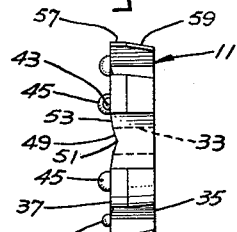
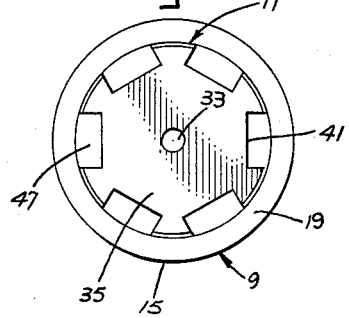
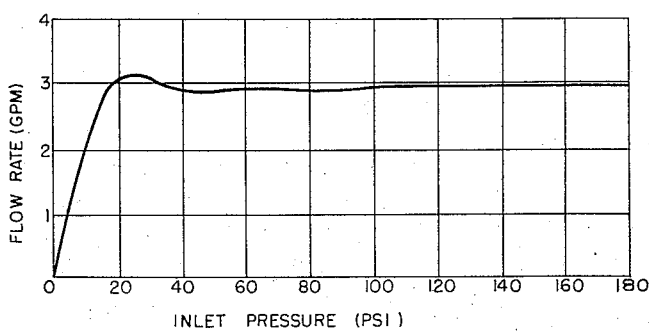
FLOW DATA CURVE
Inventor:
Leon H. Cutler
by Thomas A. Briody
His Attorney

United States Patent Office 3,138,177
Patented June 23, 1964

3,138,177
FLOW CONTROL DEVICE
Leon H. Cutler, New Haven, Conn., assignor to General
Electric Company, a corporation of New York
Filed Sept. 6, 1961, Ser. No. 136,239
7 Claims. (Cl. 138—46)

My invention relates to devices for controlling the flow of a fluid through a pipe or other conduit and more particularly to such devices for maintaining a relatively constant outlet flow over a wide range of inlet pressures.

Flow control devices for regulating the flow through a conduit so as to produce a relatively constant outlet flow regardless of the inlet pressure are used in various types of apparatus. By way of example, these devices, hereinafter referred to simply as flow control devices, are used in drinking fountains, in water heating apparatus, and in lavatory and shower bath equipment. Further, these devices have found wide use in automatic washing machines for controlling the rate of filling of the water containing tub, so that for a given period of time, a predetermined quantity of water will enter the tub. These devices are also applicable for preventing splashing or spraying out of the tub when abnormally high inlet pressures occur.

It is a general object of my invention to provide a new and improved flow control device which is simple in construction, efficient in operation, and effective to maintain a relatively constant flow over a wide range of inlet pressures.

Another and more specific object of my invention is to provide a flow control device which is particularly suited for use in automatic washing machines.

A further object of my invention is to provide an improved flow control device which is low in cost and readily manufacturable.

In carrying out my invention, in one form thereof, I provide a flow control device having a passageway or chamber through which is passed the flow to be controlled. An outlet nozzle is located at the downstream end of the passageway. By my invention, a resilient annulus and a specially configured rigid member cooperably associated with this annulus, are positioned within the passageway. The resilient annulus is disposed in contiguity with the outlet nozzle and the rigid member is disposed upstream of the resilient annulus and in coaxial relationship with it. The rigid member has a centrally disposed bypass aperture which is formed in it and a plurality of radial grooves that are formed on its downstream face. The bypass aperture of the rigid member communicates with an outlet aperture of the resilient annulus to provide a path for bypass flow through the control device. The grooves of the rigid member intersect the bypass aperture at their inner ends and extend radially outwardly from near the bypass aperture to communicate with axially extensive interruptions that are formed in the periphery of the rigid member. These interruptions are angularly spaced about the periphery of the rigid member and together with their associated radial grooves, they serve as flow paths to the outlet aperture of the resilient annulus. The resilient annulus includes a ring-shaped upstream face disposed immediately adjacent the downstream face of the rigid member for engagement by the rigid member. With such an arrangement, the rigid member is forced against the resilient annulus with increasing inlet pressure to cause the resilient material of the annulus to progressively deform into the grooves and limit the flow therethrough. As inlet pressure increases, flow through the grooves thus decreases and flow through the bypass path of the resilient annulus and rigid member thereupon increases, resulting in a relatively constant outlet flow which is maintained over a wide range of inlet pressures.

Further aspects of my invention will become apparent hereinafter, and the subject matter which I regard as my invention is particularly pointed out and distinctly claimed in the concluding portion of the specification. My invention, however, both as to organization and method of operation, together with further objects and advantages thereof, may best be understood by reference to the following description when taken in conjunction with the accompanying drawings, in which:

FIG. 5 is a fragmentary exploded view, showing the downstream end of the valve body, the flow controlling parts and the outlet nozzle;

FIG. 6 is a view of the downstream face of the rigid flow control member of my invention;

FIG. 7 is a side elevation view of the rigid flow control member of my invention;

FIG. 8 is a view of the upstream face of the rigid flow control member of the present invention with the resilient annulus shown in aligned position behind it; and FIG. 9 is a performance curve for one embodiment of my improved flow control device based on actual test data, and showing the flow rate through the device in gallons per minute over a large range of inlet pressures.

Figure 1:
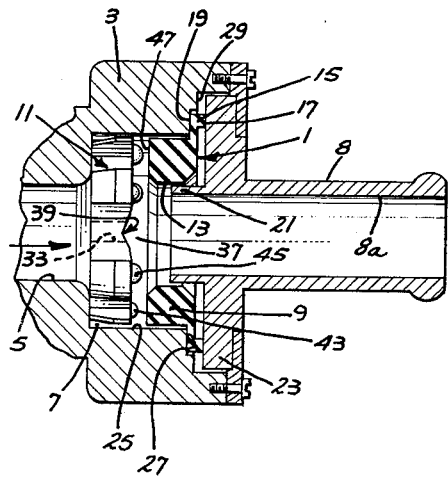
FIG. 1 is a central cross-section through one end of a typical valve body equipped with one form of my improved flow control device, the view showing the rigid control member in full and in a position it might assume at zero inlet pressure.

Referring now to the drawings, I have shown therein a preferred embodiment of my new and improved flow control device 1 incorporated within a portion of a casing 3 which may be a valve body such as is used in control valves in washing machines and the like. The casing 3 is shown as having a fluid conduit 5 leading into a chamber 7 which opens into an outlet nozzle 8 suitably fastened to casing 3. Fluid flows into chamber 7 from conduit 5 in the direction as indicated by the arrows in FIGS. 1-3.

Figure 2:
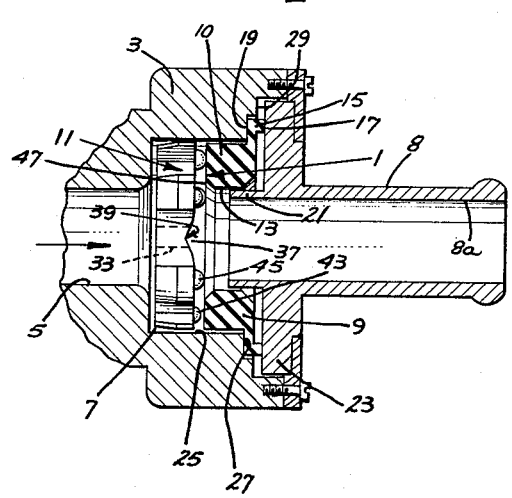
FIG. 2 is a view similar to that shown in FIG. 1 with the rigid control member in the position which it would assume when a relatively slight inlet pressure is exerted thereupon.
Figure 3:
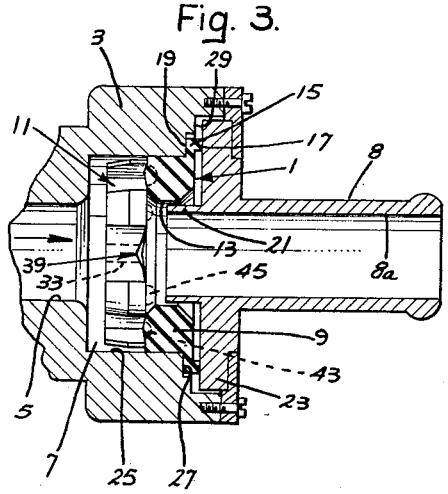
FIG. 3 is a view similar to that shown in FIG. 1 with the rigid control member in the position it would assume at a substantially elevated inlet pressure.
Figure 4:
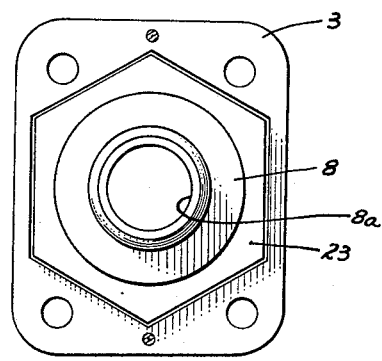
FIG. 4 is an end view of the valve body, looking upstream from the outlet nozzle.

To enable flow control device 1 to efficiently maintain a relatively constant rate of outlet flow over a wide range of inlet pressures and at the same time to enhance the simplicity of construction and ease of manufacture thereof, as shown in FIG. 5, it is essentially a two-part arrangement consisting of resilient annulus 9, and a cooperating rigid annular member 11. The annulus 9, by way of example, may be formed of a synthetic rubber, such as neoprene rubber having a durometer hardness in the order of 68. Structurally, annulus 9 includes a cylindrical body section 10 with a centrally located cylindrical aperture 13 formed therethrough and a projecting ring or flange 15 formed on the outer periphery of one of the ends. The projecting ring 15 has an L-shaped cross section and, as shown in FIGS. 1-3, includes a downstream annular lip 17 and an upstream annular shoulder 19. Both the lip 17 and the shoulder 19 are disposed in planes perpendicular to the axis of the annulus 9. The purpose of the lip 17 and shoulder 19 is to enable the annulus to be used as a gasket, as shall become apparent hereinafter.

The outlet nozzle 8 has a centrally disposed cylindrical projecting section 21 which is inserted into the central aperture 13 of resilient annulus 9, as shown in FIGS. 1-3, and a hexagonal flange 23 which is in sealing engagement with the downstream lip 17 of the resilient annulus 9. The section 21 of the nozzle projects inwardly from flange 23 toward member 11, and partially lines the inner surface of annulus aperture 13 to maintain a relatively fixed internal diameter thereof. Due to the fixed internal diameter of aperture 13 maintained by nozzle section 21, as shall be understood from further description of other structure of device 1 hereinafter, no flow controlling action or deformation of the annulus 9 occurs at aperture 13. For positioning the resilient annulus 9 and outlet nozzle 8 in the mouth of casing 3, chamber 7 includes a smooth cylindrical surface 25, a ring-shaped shoulder 27, and a hexagonally-shaped shoulder 29. The cylindrically configured body section 10 of resilient annulus 9 is inserted into chamber 7 so that the outer surfaces of section 10 are in close proximity to the smooth cylindrical surface 25 of the chamber. The upstream shoulder 19 of the annulus 9 thereupon rests against shoulder 27 of casing 3. The outlet nozzle 8 is fastened to casing 3 as previously set forth, and the hexagonally-configured flange 23 is thereby secured in close proximity to shoulder 29 within a hexagonally-configured outer mouth of the cavity. (See FIG. 5.) Flange 23 of the outlet nozzle 8 securely engages the downstream annular lip 17 of the resilient annulus 9 to sandwich the projecting ring 15 between flange 23 and casing shoulder 27. It will thus be seen that annulus 9 serves as a compressible gasket for precluding any undesirable leakage to the outside of the valve.

The rigid annular member 11 has an over-all appearance resembling an irregular disc, and may be constructed of a suitable corrosive resistant metallic material such as sintered brass. Member 11 includes a centrally disposed bypass aperture 33 which opens at one end into a flattened upstream face 35 (FIG. 8) and at the other end into a downstream flow controlling face 37 (FIG. 6). The flow controlling face 37 of member 11 is clearly shown in FIGS. 5-7, and essentially includes a plurality of radial grooves 39 which converge toward bypass aperture 33, a plurality of peripheral passageways 41 which intersect associated grooves 39 (FIG. 5) and extend parallel to the axis of the member toward upstream face 35 (FIGS. 6 and 7), and a plurality of hemispherical pads or bosses 43 and 45 interposed alternately between the grooves 39 near their outermost ends.

The rigid member 11 is positioned in chamber 7 on the upstream side of resilient annulus 9 with the flow controlling face 37 nearest to the annulus, as shown in FIGS. 1-3. The pads 43 and 45 project outwardly from the principal plane of face 37 toward the plane of the upstream face or end 47 of annulus 9, and they are normally disposed in close proximity to face 47 (as shown in FIG. 1). These pads 43, 45 serve as standoff elements to initially space the upstream annulus face 47 from the grooves 39 of member 11, at low inlet pressures, and thereby allow substantially maximum initial flow to pass through the device. In viewing FIGS. 6 and 7, it will be noted that the radius of pad 43 is less than that of pad 45. When the axes of the annulus 9 and member 11 are generally aligned, pads 43 are thus normally located at a greater distance from upstream face 47 of annulus 9 than are the pads 45. By utilizing hemispherical pads 43 and 45 of alternately differing radii, a very smooth transition is achieved as the pads of the rigid member 11 cooperatively engage the upstream face 47 of the resilient annulus 9.

The radial grooves 39 are in general V-shaped in configuration. To enhance effective and gradual coaction between these grooves and the resilient annulus 9, and thereby create a very smooth over-all flow controlling performance characteristic for the device 1, each of the grooves 39 includes two pairs of convergent surfaces 49 and 53. (See FIGS. 5 and 7.) The innermost pair of convergent surfaces 49 intersect at 51 to provide the bottom of the groove. The outer pair of surfaces 53 of each groove converge toward each other but are spaced apart and located so that they intersect the inner convergent surfaces 49, respectively, at protuberant edges 55.

The flat upstream face 35 of rigid member 11, as shown in FIG. 8, has the appearance of a circle with peripherally spaced rectangular interruptions formed thereon. These interruptions represent the upstream ends of the peripheral passageways 41. (See also FIG. 5.) Each of the passageways 41 is rectangularly-shaped and communicates in perpendicular fashion at its downstream end with an associated radial groove 39. It will thus be seen that each passageway 41 combines with a communicating groove 39 to thereby provide an over-all L-shaped peripheral passageway. These L-shaped passageways are angularly spaced apart, as shown in FIG. 5, and it is with these passageways (and more specifically with the radial grooves 39) that resilient annulus 9 cooperates to provide the desired flow controlling action for my improved device.

The outer periphery of the body of member 11 between each adjacent pair of passageways 41 comprises a cylindrical surface 57, which intersects a conically configured surface 59 at 61 (FIG. 5). The intersecting surfaces 57 and 59 of each pair are angularly spaced apart and coaxial to adjacent pairs of intersecting surfaces 57 and 59. The cylindrical surfaces 57 of the body of member 11 are positioned in cavity 7 of casing 3 adjacent the smooth cylindrical surface 25 thereof (FIG. 1). Conical surfaces 59 serve to preclude possible jamming of rigid member 11 in chamber 7 (FIG. 1). The annular inner end 47 of resilient annulus 9 is in traversing overlying proximity to the radial grooves 39 so that as the rigid member 11 moves from the position where it is shown in FIG. 1 into fluid pressurized engagement with annulus 9, the annulus is progressively deformed into the grooves to limit the flow therethrough.

*Operation*

When the flow control device 1 is operated in its normal inactive position or at zero pressure, the device will appear similarly to the arrangement as shown in FIG. 1. At very low pressures, fluid will then initially pass freely in the direction indicated by the arrow through the peripheral passageways 41, their communicating radial grooves 39, and outlet aperture 13 of the resilient annulus 9 into the bore 8a of the outlet nozzle 8. At the same time, bypass fluid also passes through central passages 33 and 13 into the bore 8a of the outlet nozzle 8. As the pressure on the upstream side of the rigid member 11 thereupon increases from zero or very low pressures, member 11 then moves into compressive engagement with the resilient annulus 9. (See FIG. 2.) The outermost ends of the larger hemispherical pads 45 first engage the annular end 47 of annulus 9, followed thereafter by the outermost ends of the smaller pads 43. The pads 43 and 45, as previously set forth, space annulus end 47 from the grooves 39 at relatively low upstream pressures, to allow a substantially maximum fluid flow to pass through the device. The staggering of the heights of the pads 43 and 45 effects a relatively smooth transition as these pads move into compressive engagement with the resilient annulus upon the gradual increase of upstream fluid pressure.

After the standoff pads 43 and 45 of the rigid annular member 11 initially engage the annular inner end 47 of the resilient annulus 9 (FIG. 2), subsequent increase of upstream fluid pressure eventually causes these pads to gradually sink themselves into compressive engagement with the resilient annulus, as shown in FIG. 3. The next stage of control provided by device 1 is then effected by progressive deformation of the resilient annulus 9 into the radial grooves 39. As the inlet pressure gradually increases, the progressive deformation of resilient annulus 9 gradually closes the radial grooves 39 of member 11, as suggested by FIG. 3. In other words, the higher the inlet pressure, the harder the rigid member 11 is forced against the resilient annulus 9, and the more the annulus deforms into the grooves. The annulus 9 progressively attenuates or cuts down flow through the grooves 39 until at a very high inlet pressure it substantially blocks or obstructs flow through the grooves. While the annulus 9 attenuates flow through the grooves 39, bypass flow of the fluid continues through aperture 33 and aperture 13 into the bore of the outlet nozzle 8. This bypass flow becomes increasingly greater as the inlet pressure increases. The result of all this is that a relatively constant outlet flow is obtained in the outlet nozzle over a wide range of inlet pressures. By the selection of an appropriate diameter for aperture 33, compensation is thereby provided for the "falling off" rate of flow through the device, due to the progressive deformation of the annulus 9 into the radial grooves 39. By utilizing V-shaped grooves 39 with double surfaced sides 49, 53, a relatively smooth and efficient operative cooperation between the grooves of the rigid member 11 and the inner end 47 of the resilient annulus 9 is thereby achieved.

Referring now to FIG. 9, I have plotted therein in graph form results obtained from one particular embodiment of my flow control device. The embodiment which gave these results includes a rigid annular member, such as the member 11, having an outer diameter of .730 inch, in which the bypass aperture 33 was of a diameter of approximately .086 inch and six radial grooves 39 were uniformly configured with a depth in the order of .031 inch and a width approximating .216 inch. The inner convergent surfaces 49 of the grooves 39 had an included angle of 134° and the outer convergent surfaces 53 of the grooves 39 had an included angle of 164°. The hemispherical pads 43 had a radius of approximately .025 inch and the hemispherical pads 45 had a radius of approximately .031 inch. The resilient annulus for which the graph results were obtained was formed of neoprene rubber having a durometer hardness of 68, and the central aperture thereof had an internal diameter of .300 inch. In the graph, the pressures applied at the upstream side of the flow control device are plotted along the abscissa in pounds per square inch gage, and the outlet flow from the device is plotted along the ordinate in gallons per minute. It will be noted that in the wide range of pressures from 20 pounds per square inch to 180 pounds per square inch, the outlet flow was maintained in a narrow band between about 2.9 gallons per minute and about 3.1 gallons per minute. In other words, over a 160 pounds per square inch range of inlet pressures, the outlet flow varied by approximately .2 gallon per minute from its lowest to its highest value. With such a minor variation in outlet flow over such a wide range of inlet pressures, the device is particularly well suited for washing machines, lavatory and shower bath apparatus, drinking fountains, vending machines, etc.

It will now therefore be seen that I have provided an improved flow control device which achieves a very large initial flow and is effective to very efficiently maintain a relatively constant flow over a wide range of inlet pressures. This device is extremely inexpensive to manufacture and assemble. The rigid annular member and the resilient annulus may be easily and readily assembled together since there is no precision fitting or the like involved.

While in accordance with the patent statutes, I have described what at present is considered to be the preferred embodiment of my invention, it will be obvious to those skilled in the art that various changes and modifications may be made therein without departing from the invention, and it is therefore aimed in the appended claims to cover all such changes and modifications as fall within the true spirit and scope of the invention.

What I claim as new and desire to secure by Letters Patent of the United States is:

1. A flow control device for maintaining a relatively constant rate of fluid flow over a range of inlet pressures, said flow control device comprising a flow passageway, a resilient annulus and a rigid annular member positioned in said passageway with said rigid member disposed upstream of and in coaxial relationship with said annulus, said rigid member having a centrally disposed bypass aperture formed therein and a plurality of radial grooves formed on its downstream face, the bypass aperture of said rigid member communicating with an aperture of said annulus to provide a path for bypass flow through said control device, said grooves intersecting the bypass aperture of said member at the inner ends thereof and extending radially outwardly therefrom to communicate with axially extensive flow passing interruptions formed in the periphery of said member, said annulus including an upstream face disposed immediately adjacent said downstream face of said rigid member for engagement thereby, said rigid member being forced against said annulus with increasing inlet pressure to cause the material of said annulus to progressively deform into said grooves to limit flow therethrough and provide a relatively constant outlet flow at varying pressures.

2. A flow control device for maintaining a relatively constant rate of fluid flow over a range of inlet pressures, said flow control device comprising a flow passageway, a resilient annulus and a rigid annular member positioned in said passageway with said rigid member disposed upstream of and in coaxial relationship with said annulus, said rigid member having a centrally disposed bypass aperture formed therein and a plurality of radial grooves formed on its downstream face, the bypass aperture of said rigid member communicating with an aligned aperture of said annulus to provide a path for bypass flow through said control device, said grooves having their longitudinal axes convergent toward the axis of said rigid member and disposed in a plane perpendicular to the axis of said rigid member, the outer ends of said grooves communicating with associated axially extensive flow passing interruptions formed in the periphery of said member, said annulus including an upstream face disposed immediately adjacent said downstream face of said rigid member for engagement thereby, said rigid member being forced against said annulus with increasing inlet pressure to cause the material of said annulus to progressively deform into said grooves to limit flow therethrough and provide a relatively constant outlet flow at varying inlet pressures.

3. A flow control device for maintaining a relatively constant rate of fluid flow over a range of inlet pressures, said flow control device comprising a flow passageway, a resilient annulus and a rigid annular member positioned in said passageway with said rigid member disposed upstream of and in coaxial relationship with said annulus, said rigid member having a centrally disposed bypass aperture formed therein and a plurality of radial grooves formed on its downstream face, the bypass aperture of said rigid member communicating with an aligned aperture of said annulus to provide a substantially uniform path for bypass flow through said control device, said grooves having their longitudinal axes convergent toward the axis of said rigid member and disposed in a plane perpendicular to the axis of said rigid member, each said groove being generally V-shaped in cross section and formed by at least two pairs of angularly related inner and outer convergent surfaces, the inner pair of said convergent surfaces disposed angularly in intersecting relationship to provide the bottom of the groove, the outer pair of convergent surfaces spaced apart and intersecting the inner convergent surfaces, said outer surfaces being disposed relative to each other at a greater included angle than the inner convergent surfaces thereby to provide a four-sided groove with an outwardly angled edge on each side thereof, the outer ends of said grooves communicating with associated axially extensive flow passing interruptions formed in the periphery of said member, said annulus including an upstream face disposed immediately adjacent said downstream face of said rigid member for engagement thereby, said rigid member being forced against said annulus with increasing inlet pressure to cause the material of said annulus to progressively deform into said grooves to limit flow therethrough and provide a relatively constant outlet flow at varying inlet pressures.

4. A flow control device for maintaining a relatively constant rate of fluid flow over a range of inlet pressures, said flow control device comprising a flow passageway, a resilient annulus and a rigid annular member positioned in said passageway with said rigid member disposed upstream of and in coaxial relationship with said annulus, means for supporting a peripheral portion of said annulus in said passageway said rigid member having a centrally disposed bypass aperture formed therein and a plurality of angularly spaced radial grooves and projections formed on its downstream face, the bypass aperture of said rigid member communicating with an aperture of said annulus to provide a substantially uniform path for bypass flow through said control device, said grooves intersecting the bypass aperture of said member at the inner ends thereof and extending radially outwardly therefrom to communicate with axially extensive flow passing interruptions formed in the periphery of said member, said annulus including an upstream face disposed adjacent said downstream face of said rigid member for engagement by said grooves and said projections, said rigid member being forced against said annulus with increasing inlet pressure to cause the material of said annulus to progressively deform into said grooves to limit flow therethrough and provide a relatively constant outlet flow at varying inlet pressures, said projections being cooperatively engageable with the upstream face of said annulus to preclude cooperation between said grooves and said upstream face at low inlet pressures.

5. The device of claim 4 wherein the projections formed on the downstream face of said rigid annular member have staggered dimensions to smooth the transition as the projections cooperatively engage the upstream face of said annulus.

6. A flow control device for maintaining a relatively constant rate of fluid flow over a range of inlet pressures, said flow control device comprising a flow passageway, a resilient relatively fixed annulus and a rigid relatively movable annular member positioned in said passageway with said rigid member disposed upstream of and in coaxial relationship with said annulus, said rigid member having a centrally disposed bypass aperture formed therein, a relatively flat upstream face, and a plurality of radial grooves formed on its downstream face, the bypass aperture of said rigid member communicating with an aperture of said annulus to provide a path for bypass flow through said control device, said grooves being V-shaped in cross section and having their longitudinal axes convergent inwardly toward the axis of said rigid member, the outer ends of said grooves communicating with associated flow passing interruptions formed in the periphery of said member, said interruptions extending in a direction parallel to the axis of the rigid member between the upstream and downstream faces thereof, each said groove together with its associated peripheral interruption thereby providing an L-shaped passageway from the periphery of the upstream face of said member to the center of the downstream face of said member, said annulus including an upstream face disposed in transverse relationship to said grooves and adjacent said downstream face of said rigid member for engagement thereby, said rigid member being forced against said annulus with increasing inlet pressure to cause the material of said annulus to progressively deform into said grooves to limit flow therethrough and provide a relatively constant outlet flow at varying inlet pressures.

7. A flow control device for maintaining a relatively constant rate of fluid flow over a range of inlet pressures, said flow control device comprising a casing, an outlet nozzle fastened to said casing, a flow passageway extending through at least part of said casing into said outlet nozzle, a resilient annulus and a rigid annular member positioned in said passageway with said rigid member disposed upstream of and in coaxial relationship with said annulus, said annulus including a ring-shaped projecting flange for sealing engagement with adjacent opposed surfaces of said nozzle and said casing, said rigid member having a centrally disposed bypass aperture formed therein and a plurality of angularly spaced radial grooves and projections formed on its downstream face, said projections having staggered dimensions, the bypass aperture of said rigid member communicating with an aligned aperture of said annulus to provide a substantially indeformable path for bypass flow through said control device, said grooves having their longitudinal axes convergent toward the axis of said rigid member and disposed in a plane perpendicular to the axis of said rigid member, each said groove being generally V-shaped in cross section and formed by at least two pairs of angularly related inner and outer convergent surfaces, the inner pair of said convergent surfaces disposed angularly in intersecting relationship to provide the bottom of the groove, the outer pair of convergent surfaces spaced apart and intersecting the inner convergent surfaces, said outer surfaces being disposed relative to each other at a greater included angle than the inner convergent surfaces thereby to provide a four-sided groove with an outwardly angled edge on each side thereof, the outer ends of said grooves communicating with associated axially extensive flow passing interruptions formed in the periphery of said member, said annulus including an upstream face disposed adjacent said downstream face of said rigid member for engagement by said grooves and said projections, said rigid member being forced against said annulus with increasing inlet pressure to cause the material of said annulus to progressively deform into said grooves to limit flow therethrough and provide a relatively constant outlet flow at varying inlet pressures, said projections being cooperatively engageable with the upstream face of said annulus to preclude cooperation between said grooves and said upstream face at low inlet pressures.

References Cited in the file of this patent
UNITED STATES PATENTS

| Re. 24,534 | Dahl | Sept. 16, 1958 |
| 2,289,905 | Dasher | July 14, 1942 |
| 2,460,647 | Miller | Feb. 1, 1949 |
| 2,554,790 | Miller | May 29, 1951 |
| 2,762,397 | Miller | Sept. 11, 1956 |
| 2,813,541 | Beller | Nov. 19, 1957 |
| 2,815,041 | Rimsha et al. | Dec. 3, 1957 |
| 2,878,836 | Binks | Mar. 24, 1959 |
| 2,936,790 | Dahl et al. | May 17, 1960 |